United States Patent

Harder et al.

[11] Patent Number: 5,886,834
[45] Date of Patent: Mar. 23, 1999

[54] PASSIVE SCENE BASE CALIBRATION SYSTEM

[75] Inventors: James A. Harder, Bedford; Val J. Herrera, Double Oak, both of Tex.

[73] Assignee: Raytheon TI Systems, Inc., Lewisville, Tex.

[21] Appl. No.: 931,925

[22] Filed: Sep. 17, 1997

Related U.S. Application Data

[62] Division of Ser. No. 741,877, Oct. 30, 1996, Pat. No. 5,745,285.

[60] Provisional application No. 60/008,144, Oct. 31, 1995.

[51] Int. Cl.[6] .............................. G02B 13/18; G02B 13/14
[52] U.S. Cl. ........................ 359/724; 359/357; 359/362; 359/642; 359/711
[58] Field of Search ...................................... 359/205–206, 359/215, 350, 361, 354–357, 362–363, 399–402, 407, 432, 708–724, 744; 250/252.1 A, 252.1 R, 559.1; 356/243

[56] References Cited

U.S. PATENT DOCUMENTS

| | | | |
|---|---|---|---|
| 4,679,891 | 7/1987 | Roberts | 359/357 |
| 5,142,416 | 8/1992 | Nakamura et al. | 359/711 |
| 5,282,083 | 1/1994 | Hall | 359/357 |

*Primary Examiner*—Thong Nguyen
*Attorney, Agent, or Firm*—Baker & Botts, L.L.P.

[57] ABSTRACT

An image detection system (10) uses an optical configuration for both image forming and calibration phases of operation. A field lens (20) has an inner portion (36) of a conventional prescription to allow for collection of scene based energy for an opto-electronic approximation of the infrared detail within the afocal field of view by a focal plane array (32). The field lens (20) also has an outer portion (38) that collects far field energy from a scene area ($A_f$) through a converging point ($P_f$). The energy collected from the scene area ($A_f$) is indicative of the average energy level within the scene. The electrical equivalent values of all energy received from the unique area ($A_f$) is stored in a multidimensional range used for subsequent gain and offset calibration coefficient calculations.

15 Claims, 2 Drawing Sheets

PASSIVE SCENE BASE CALIBRATION SYSTEM

This application is a division of U.S. Ser. No. 08/741,877 filed Oct. 30, 1996, now U.S. Pat. No. 5,745,285, which claimed the priority under 35 USC §119 of Provisional Application No. 60/008,144 filed Oct. 31, 1995.

TECHNICAL FIELD OF THE INVENTION

The present invention relates in general to image scanning and detection technology and more particularly to a passive scene based calibration system.

BACKGROUND OF THE INVENTION

Image detecting systems typically scan scene based images onto a focal plane array made up of individual detector elements. Each detector element within the focal plane array has a unique output voltage offset and gain reported upon detection of an image. The unique output voltage offsets and gains of the individual detector elements are a result of an inherent inability to produce identical detector elements during the manufacturing process. The inability to produce identical detector elements requires that an imaging system perform calibration on the focal plane array to compensate for the varying output voltage offsets and gains from one of the individual detector elements to another despite detecting identical portions of an image.

Calibration of imaging systems typically requires that calibration reference levels be viewed by the focal plane array during system operation. The calibration time can take time away from viewing the actual scene images. The calibration references of typical scan systems are produced by thermo-electrical devices that are optically viewed during the calibration period. Replacing the thermo-electrical devices with modified optical elements already in the system is desirable to reduce system complexity. Viewing these modified optical elements during normal scan return times also simplifies system operation.

Therefore, it is desirable to perform calibration with modified scene elements inherent within a typical scan system.

From the foregoing, it may be appreciated that a need has arisen for scene based calibration of an image detecting system. In accordance with the present invention, a passive scene based calibration system is provided that substantially eliminates or reduces disadvantages and problems associated with conventional image detecting system calibration techniques.

According to an embodiment of the present invention, there is provided a passive scene based calibration system that includes an optical environmental interface for receiving image energy from a scene. The image energy from the scene passes through the optical environmental interface to an afocal lens assembly that performs an image forming function and a calibration function in response to the image energy. A scanning mirror scans the image energy across a focal plane array. The focal plane array forms an opto-electronic approximation of the infrared detail of the image energy. A converging optics assembly inverts the image energy prior to reaching the focal plane array.

The present invention provides various technical advantages over conventional image detecting system calibration techniques. For example, one technical advantage is to perform scene based calibration. Another technical advantage is to perform calibration using the same lens configuration as used in image detecting. Yet another technical advantage is using a field lens that has an inner portion for image detection and an outer portion for calibration. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
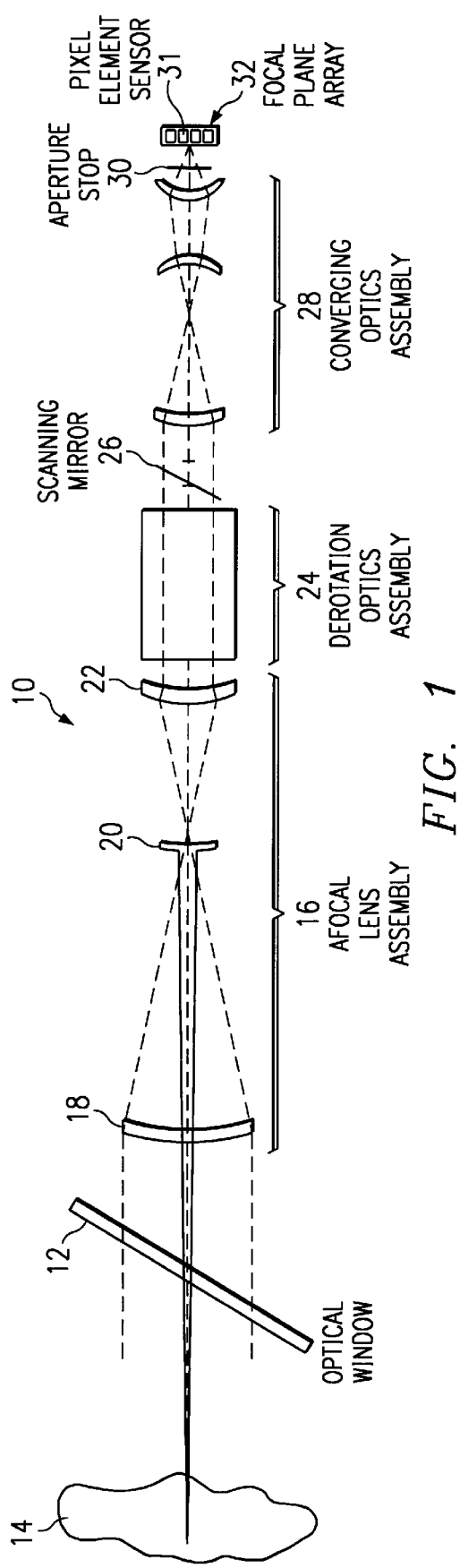
FIG. 1 illustrates an optical configuration of an image detecting system.

FIG. 1 is a block diagram of an optical configuration for an imaging detection system 10. Image detection system 10 includes an optical environmental interface 12, such as a window or dome, for receiving energy from a scene 14. Energy from scene 14 passes through optical environmental interface 12 to an afocal lens assembly 16. Afocal lens assembly 16 includes an objective lens 18, a field lens 20, and an eyepiece lens 22. Energy from scene 14 passes through objective lens 18, field lens 20, and eyepiece lens 22 of afocal lens assembly 16 to a derotation optics assembly 24. Scene based energy continues to pass through derotation optics assembly 24 to a scanning mirror 26. Scanning mirror 26 scans the scene based energy across a converging optics assembly 28. Scanned scene based energy passes through converging optics assembly 28 and through an aperture stop 30 for image detection by individual detector elements 31 within a focal plane array 32.

Image detection system 10 may operate in a cyclical manner. A cycle may be defined as the time it takes to complete one repetitive maneuver of scanning mirror 26. Each cycle consists of a series of time sequential phases. The time sequential phases may include an image forming phase, a transition phase, a calibration phase, and a flyback phase. The image forming phase allows for image detection of scene 14 by individual detector elements 31 of focal plane array 32. The calibration phase allows for the correction of gain and offset parameters to be performed on individual detector elements 31. The transition phase allows for image detection system 10 to prepare for changing between image forming and calibration phases. The flyback phase allows for scanning mirror 26 to return to its initial scanning position.

During image forming operation, energy from scene 14 passes through optical environmental interface 12 and through objective lens 18, field lens 20, and eyepiece lens 22 of afocal lens assembly 16. Energy collection for image formation passes through an inner portion of field lens 20. In this fashion, objective lens 18, field lens 20, and eyepiece lens 22 function as an afocal telescope during the image forming operation. Scene based energy passing through the inner portion of field lens 20 proceeds through derotation optics assembly 24 onto scanning mirror 26. Scanning mirror 26 scans the scene based energy across focal plane array 32 through converging optics assembly 28 and aperture stop 30.

Objective lens 18 focuses scene based energy onto an intermediate image plane directly ahead of field lens 20. Field lens 20 controls the eyepiece size and exit pupil location for image detection system 10. Eyepiece 22 recollimates the scene based energy relayed from field lens 20 and directs it toward scanning mirror 26. Scanning mirror 26, located at the exit pupil, sweeps the optical bundle sequentially into the aperture of converging optics assembly 28. Converging optics assembly 28 forms an inverted image of the scanned scene based energy at another intermediate image plane before relaying it towards focal plane array 32. Individual detector elements 31 sequentially sample and store scene based energy from small areas of scene 14 into a multidimensional array. The multidimensional array is used to form an opto-electronic approximation of the infrared detail within the afocal field of view. Aperture stop 30 ensures a constant optical system f/number in imager space for all phases of operation.

Figure 2:
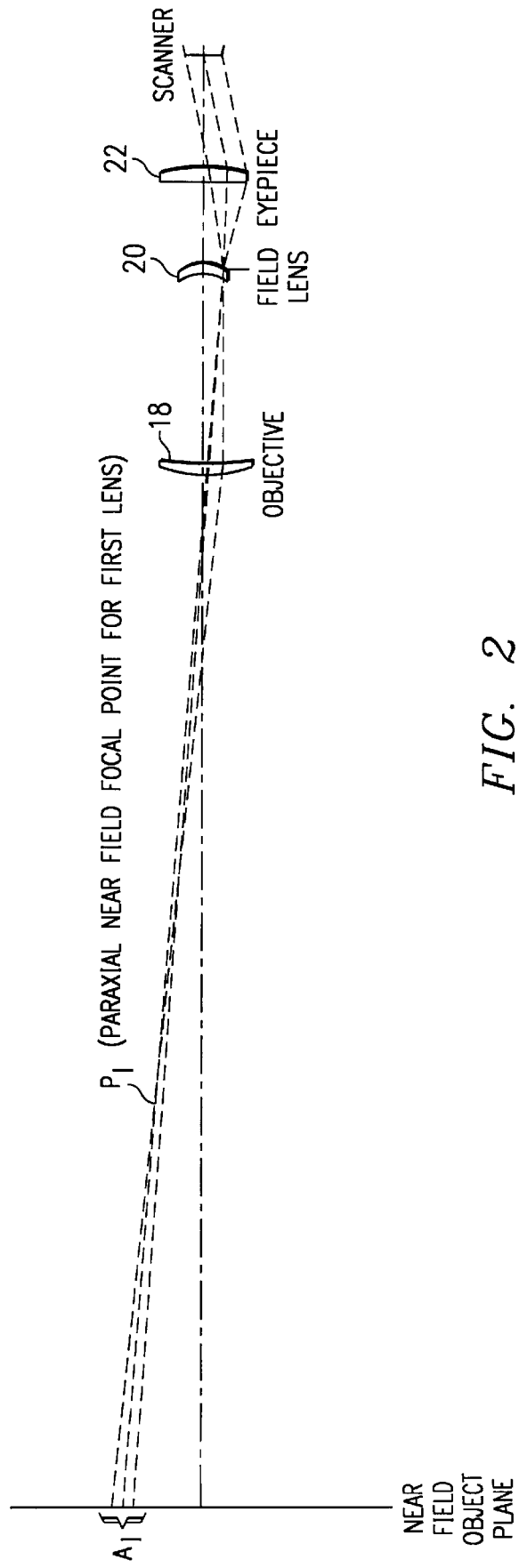
FIG. 2 illustrates a calibration function performed by the optical configuration of the image detecting system.

FIG. 2 illustrates the calibration function of optical configuration 10. Scene based energy proceeds through a specific region $A_f$ of optical environmental interface 12 and converges on a point $P_f$. Point $P_f$ is the paraxial near field focal point for objective lens 18. Objective lens 18 collects scene based energy from a near field object plane located near its first focal point and relays that energy into an outer annular portion of field lens 20. Thus, far field energy passing through converging point $P_f$ from region $A_f$ continues through objective lens 18 to an outer annular portion of field lens 20. Scene based energy passing through the outer portion of field lens 20 is used by focal plane array 32 for calibration purposes.

Figure 3A:
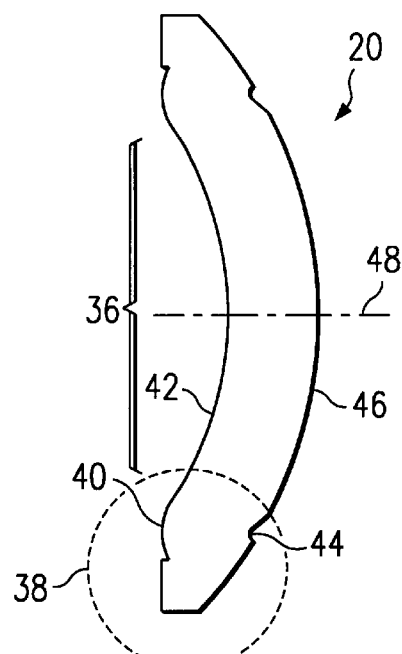
FIG. 3A is a diagrammatic sectional side view of a field lens which is a component of the image detecting system of FIG. 1.
Figure 3B:
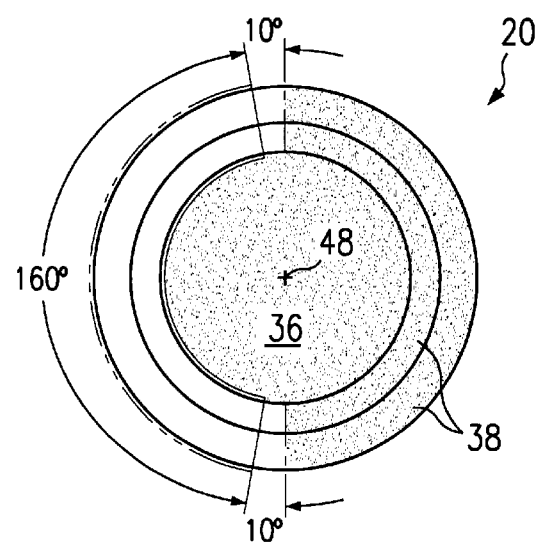
FIG. 3B is a diagrammatic front view of the field lens of FIGS. 1 and 3A.

FIGS. 3A and 3B show the shape of field lens 20. As shown in FIG. 3A, field lens 20 has a conventional inner portion 36 and a nonconventional outer annular portion 38. Outer annual portion 38 of field lens 20 includes a first toroidal asphere 40 having a convex shape on a first surface 42 and a second toroidal asphere 44 having a concave shape on a second surface 46. First toroidal asphere 40 and second toroidal asphere 44 diverge scene based energy relayed from converging point $P_f$ by objective lens 18. The diverged energy is recollimated by eyepiece lens 22 and directed towards scanning mirror 26. After being scanned, energy is collected and focused onto focal plane array 32 by converging optics assembly 28 in the same manner as scene based energy containing image data. Aperture stop 30 is located behind converging optics assembly 28 in order to maintain the same near field f number during both the calibration phases and the image forming phases.

Because the near field object plane of objective lens 18 is imaged onto focal plane array 32, the energy imaged onto each individual detector element 31 within focal plane array 32 will be from an area of the far field designated as $A_f$ that can radiate through a point $P_f$ located in the near field image plane and into objective lens 18 and field lens 20. Each individual detector element 31 in focal plane array 32 collects far field energy from this unique area $A_f$. The energy collected from area A is representative of the average energy level within scene 14 for calibration purposes. The electrical equivalent values of all received energy is stored in a multidimensional array and is used for subsequent gain and offset calibration coefficient calculations As shown in FIG. 3B, field lens 20 may be coated or specially blazed to provide enhanced calibration and image forming functionality. For example, a coating may be applied to a one hundred eighty degree area of outer annular portion 38 of field lens 20 as shown. There would be no coating within a one hundred sixty degree area of outer annular portion 38 in order to provide various calibration approaches for image detection system 10. As shown in FIG. 3B, there are also two ten degree transition or separation areas which are each disposed between the one hundred eighty degree coated area and the one hundred sixty degree area, at respective ends of the coated area. Similar coating or blazing may be applied to inner portion 36 for alternative image forming operation.

A specific example has field lens 20 made of an optical grade material, specification 801530, such as germanium for infra-red transmission. First surface 42 is a concave general aspheric of revolution about a center axis 48. First surface 42 is defined by the following equation for the SAG as a function of semi-diameter y.

$$SAG_{42} = \frac{y^2/RD}{1 + \sqrt{[1 - (1+k)(y^2)(RD^{-2})]}} A(y^4) + B(y^6) + C(y^8) + D(y^{10})$$

where
RD=0.88466±0.1%
k=0
A=0.117412
B=−1.19125
C=6.61305
D=−13.5513

Second surface 46 is a convex spherical surface of the form $$SAG_{46} = \frac{(1/RD)(y^2)}{1 + [1 - (y/RD)^2]^{0.5}}$$

where
RD=1.0214±0.1%
Second surface is defined between y=0.000 and 0.395
First toroidal asphere 40 is defined by $$SAG_{40} = \frac{(1/RD)(y')^2}{1 + [1 - (1+k)(y'/RD)^2]^{0.5}}$$

where
RD=0.15816±1%
k=−0.43839
y'=(distance to the lens centerline)−0.509
The vertex of first toroidal asphere 40 with respect to the vertex of first surface 42 is located at coordinates y=0.509 and z=−0.138. First toroidal asphere 40 is defined between y=0.395 and 0.609.

Second toroidal asphere 44 is defined by $$SAG_{44} = \frac{(1/RD)(y')^2}{1 + [1 - (1+k)(y'/RD)^2]^{0.5}}$$

where
RD=0.016697±1%
k=−1.4725
y'=(distance to the lens centerline)−0.509
The vertex of second toroidal asphere 44 with respect to the vertex of second lens surface 46 is located at coordinates y−0.509 and z=−0.150. Second toroidal asphere 44 is defined between y=0.466 and 0.524.

The following is the SAG table for each surface of field lens 20. In this regard, surfaces R1, R2, R3 and R4 in the tables respectively correspond to surfaces 42, 46, 40 and 44 of the field lens 20 in FIG. 3A.

SAG TABLE SURFACE R1 (REFERENCE ONLY)

| (X) | (Z) |
|---|---|
| 0 | 0 |
| .024 | .000326 |
| .048 | .001304 |
| .072 | .002938 |
| .096 | .005233 |
| .12 | .008198 |
| .144 | .011839 |
| .168 | .016169 |
| .192 | .021198 |
| .216 | .026938 |
| .24 | .033403 |
| .264 | .040611 |
| .288 | .048579 |
| .312 | .057333 |
| .336 | .066899 |
| .36 | .077311 |
| .384 | .088601 |
| .408 | .100806 |
| .432 | .11395 |
| .456 | .12804 |
| .48 | .143043 |

SAG TABLE FOR SURFACE R2 (REFERENCE ONLY)

| Height above lens axis (Y) | Sag (Z) |
|---|---|
| 0 | 0 |
| 0.05 | 0.0012245 |
| 0.1 | 0.004907 |
| 0.15 | 0.0110743 |
| 0.2 | 0.0197723 |
| 0.25 | 0.0310678 |
| 0.3 | 0.0450507 |
| 0.35 | 0.0618387 |
| 0.395 | 0.0794696 |

SAG TABLE FOR SURFACE R3 (REFERENCE ONLY)

| (Y') | Height above lens axis (Y) | Sag relative to R3 vertex (Z) |
|---|---|---|
| −0.114 | 0.395 | 0.0446198 |
| −0.109 | 0.4 | 0.0404676 |
| −0.099 | 0.41 | 0.032907 |
| −0.089 | 0.42 | 0.026266 |
| −0.079 | 0.43 | 0.0204743 |
| −0.069 | 0.44 | 0.0154765 |
| −0.059 | 0.45 | 0.0112285 |
| −0.049 | 0.46 | 0.0076956 |
| −0.039 | 0.47 | 0.0048502 |
| −0.029 | 0.48 | 0.0026714 |
| −0.019 | 0.49 | 0.0011436 |
| −0.009 | 0.5 | 0.0002562 |
| 0 | 0.509 | 0 |
| 0.001 | 0.51 | 3.161E−06 |
| 0.011 | 0.52 | 9.0003828 |
| 0.021 | 0.53 | 0.0013976 |
| 0.031 | 0.54 | 0.0030546 |
| 0.041 | 0.55 | 0.0053653 |
| 0.051 | 0.56 | 0.0083464 |
| 0.061 | 0.57 | 0.0120199 |
| 0.071 | 0.58 | 0.0164148 |
| 0.081 | 0.59 | 0.0215675 |
| 0.091 | 0.6 | 0.0275242 |
| 0.1 | 0.609 | 0.0336204 |

SAG TABLE FOR SURFACE R4 (REFERENCE ONLY)

| Y' | Height above lens axis (Y) | Sag relative to R4 vertex (Z) |
|---|---|---|
| −0.043 | 0.466 | 0.0365093 |
| −0.042 | 0.467 | 0.0352463 |
| −0.041 | 0.468 | 0.0339908 |
| −0.04 | 0.469 | 0.0327432 |
| −0.039 | 0.47 | 0.031504 |
| −0.038 | 0.471 | 0.0302736 |
| −0.037 | 0.472 | 0.0290526 |
| −0.036 | 0.473 | 0.0278416 |
| −0.034 | 0.475 | 0.0254514 |
| −0.029 | 0.48 | 0.0196955 |
| −0.024 | 0.485 | 0.0143393 |
| −0.019 | 0.49 | 0.0095263 |
| −0.014 | 0.495 | 0.0054492 |
| −0.009 | 0.5 | 0.0023476 |
| −0.004 | 0.505 | 0.0004759 |
| 0 | 0.509 | 0 |
| 0.001 | 0.51 | 2.993E−05 |
| 0.006 | 0.515 | 0.0010621 |
| 0.011 | 0.52 | 0.0034545 |
| 0.015 | 0.524 | 0.0061948 |

In summary, an optical configuration for an image detection system can be used for both image forming and calibration. An afocal lens assembly having an objective lens, a modified field lens, and an eyepiece lens operate as afocal telescopes during the image forming phase and collect energy from multiple areas surrounding the afocal field of view for use as thermal references during the calibration phase. The modified field lens provides the image forming and calibration function by having a conventional inner portion and a modified outer portion. The modified outer portion includes two toroidal aspheres, one on each surface of the lens, to provide scene base reference source temperature levels for processing by detectors within the focal plane array.

Thus, it is apparent that there has been provided, in accordance with the present invention, a passive scene based calibration system that satisfies the advantages set forth above. Although the preferred embodiment has been described in detail, it should be understood that various substitutions, changes, and alterations can be made herein. For example, other optical prescriptions for the field lens may be used while still providing both the image forming and calibration functions required. Other examples are readily ascertainable by one skilled in the art and may be made without departing from the spirit and scope of the present invention as defined by the following claims.

What is claimed is:

1. An afocal lens assembly for an image detection system, comprising:

an objective lens for collecting energy from a scene;

a field lens for performing an image forming function and a calibration function on said energy, said field lens having an inner portion for performing said image forming function, said field lens having an outer portion for performing said calibration function;

an eyepiece lens for recollimating said energy from said field lens.

2. The afocal lens assembly of claim 1, wherein said outer portion of said field lens includes means for collecting energy from a far field area of a near field object plane of said objective lens.

3. The afocal lens assembly of claim 1, wherein said outer portion of said field lens includes means for collecting energy that converges at a paraxial near field focal point of said objective lens.

4. The afocal lens assembly of claim 1, wherein said outer portion of said field lens diverges said energy collected by said objective lens.

5. The afocal lens assembly of claim 1, wherein said outer portion of said field lens includes a convex toroidal shape at a first surface and a concave toroidal shape on an opposite second surface.

6. An afocal lens assembly, comprising:

an objective lens for collecting energy from a scene, wherein the energy collected by the objective lens includes separate first and second portions;

an eyepiece lens for recollimating the energy collected by said objective lens, including the first and second portions thereof; and means for causing first and second regions of a plane, which are adjacent and mutually exclusive, to receive respective parts of the first portion of the energy respectively corresponding to first and second portions of the scene that at least partially overlap, and for causing third and fourth regions of the plane, which are adjacent and mutually exclusive, to receive respective parts of the second portion of the energy respectively corresponding to third and fourth portions of the scene that are mutually exclusive, the plane being within said afocal lens assembly, said means including a calibration lens section disposed optically between the objective lens and the eyepiece lens, the first portion of the energy traveling through the calibration lens section, and the second portion of the energy traveling past the calibration lens section without passing therethrough.

7. An afocal lens assembly according to claim 6, wherein said calibration lens section diverges the first portion of the energy passing therethrough.

8. An afocal lens assembly according to claim 6, wherein said calibration lens section has a toroidal surface on one side thereof.

9. An afocal lens assembly according to claim 6, wherein said calibration lens section has a toroidal surface on each side thereof.

10. An afocal lens assembly according to claim 6, wherein said calibration lens section has a convex conic toroidal surface on one side thereof and has a concave conic toroidal surface on the other side thereof.

11. An afocal lens assembly according to claim 6, wherein said means includes a field lens having first and second sections through which respectively pass the first and second portions of the collected energy, said calibration lens section being said first section of said field lens.

12. An afocal lens assembly according to claim 11, wherein said first and second sections of said field lens are arranged concentrically with respect to each other.

13. An afocal lens assembly according to claim 12, wherein said first section of said field lens encircles said second section thereof.

14. An afocal lens assembly according to claim 11, wherein said first section of said field lens has a surface of convex conic toroidal shape on one side thereof, and has a surface of concave toroidal shape on an opposite side thereof.

15. An afocal lens assembly according to claim 14, wherein said second section of said field lens has a surface of convex aspheric shape on one side thereof, and has a surface of concave aspheric shape on an opposite side thereof.

* * * * *

UNITED STATES PATENT AND TRADEMARK OFFICE
CERTIFICATE OF CORRECTION

PATENT NO. : 5,886,834
DATED : March 23, 1999
INVENTOR(S) : Harder, et al.

It is certified that error appears in the above-identified patent and that said Letters Patent is hereby corrected as shown below:

Column 1, line 44, before line 44 insert --SUMMARY OF THE INVENTION--.

Column 3, line 65, after "calculations," insert -- . --.

Column 4, line 20, delete

"$SAG_{42} = \dfrac{y^2/RD}{1+\sqrt{[1-(1+k)(y^2)(RD^{-2})]}} A(y^4) + B(y^6) + C(y^8) + D(y^{10})$" and insert --$SAG_{42} = \dfrac{y^2/RD}{1+\sqrt{[1-(1+k)(y^2)(RD^{-2})]}} + A(y^4) + B(y^6) + C(y^8) + D(y^{10})$--.

Column 5; line 62, delete "0.011  0.52  9.0003828"
and insert --0.011  0.52  0.0003828--.

Signed and Sealed this

Twenty-first Day of September, 1999

Attest:

Q. TODD DICKINSON

*Attesting Officer*   *Acting Commissioner of Patents and Trademarks*